United States Patent [19]
Kruger

[11] Patent Number: 5,294,789
[45] Date of Patent: Mar. 15, 1994

[54] GAMMA-INSENSITIVE OPTICAL SENSOR

[75] Inventor: Hans W. Kruger, Walnut Creek, Calif.

[73] Assignee: The United States of America as represented by the United States Department of Energy, Washington, D.C.

[21] Appl. No.: 11,639

[22] Filed: Feb. 1, 1993

[51] Int. Cl.⁵ .............................................. H01J 40/14
[52] U.S. Cl. ................................................. 250/214.1
[58] Field of Search ....... 250/214.1, 214 VT, 214 LA, 250/214 LS, 385.1; 313/531, 538, 540

[56] References Cited

U.S. PATENT DOCUMENTS

| | | | |
|---|---|---|---|
| 4,070,578 | 1/1978 | Timothy et al. | 250/336 |
| 4,564,753 | 1/1986 | Van Aller et al. | 250/213 |
| 4,687,921 | 8/1987 | Kojola | 250/207 |
| 4,853,595 | 8/1989 | Alfano et al. | 313/532 |
| 4,870,265 | 9/1989 | Asmussen et al. | 250/214.1 |
| 4,902,930 | 2/1990 | Van Der Mast | 250/214 VT |
| 5,032,729 | 7/1991 | Charpak | 250/385.1 |

Primary Examiner—David C. Nelms
Assistant Examiner—K. Shami
Attorney, Agent, or Firm—L. E. Carnahan; Roger S. Gaither; William R. Moser

[57] ABSTRACT

An ultra-violet/visible/infra-red gamma-insensitive gas avalanche focal plane array comprising a planar photocathode and a planar anode pad array separated by a gas-filled gap and across which is applied an electric potential. Electrons ejected from the photocathode are accelerated sufficiently between collisions with the gas molecules to ionize them, forming an electron avalanche. The gap acts like a proportional counter. The array of anode pad are mounted on the front of an anode plate and are connected to matching contact pads on the back of the anode via feed through wires. Connection of the anode to signal processing electronics is made from the contact pads using standard indium bump techniques, for example.

22 Claims, 4 Drawing Sheets

GAMMA-INSENSITIVE OPTICAL SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The invention relates to photon detectors, particularly to ultraviolet, visible, and infra-red photon detection, and more particularly to a gamma-insensitive sensor which involves the conversion of incident optical photons into photoelectrons and subsequent amplification of these photoelectrons via generation of electron avalanches.

Photon detectors operate by converting photons into electronic signals that can be processed into pulses or images. These include devices such as photodiodes, photomultiplier tubes, vidicons, charged-coupled devices (CCD's) etc. All photon detectors are characterized by their sensitivity to photons as a function of photon energy, their ability to amplify incident photons into large electrical signals proportional to the incident photon intensity (gain), their ability to distinguish fine detail in an image (position resolution), their temporal response to incident photons (time resolution), and their inherent noise level (dark current).

Various types of photon sensing or detection devices and imaging systems using the detected photons are known in the art as exemplified by U.S. Pat. No. 5,032,729 issued Jul. 16, 1991 to G. Charpak; U.S. Pat. No. 4,853,395 issued Aug. 1, 1989 to R. R. Alfano et al.; U.S. Pat. No. 4,687,921 issued Aug. 18, 1987 to H. Kojola; U.S. Pat. No. 4,564,753 issued Jan. 14, 1986 to G. VanAller et al.; and U.S. Pat. No. 4,070,578 issued Jan. 24, 1978 to J. G. Timothy et al.

Optional sensors operating in ultraviolet, visible, and infra-red wavelength bands have a variety of applications. The current generation of sensors, such as exemplified above, uses various types of semiconductor focal plane arrays to detect the optical photons emitted, for example, by the combustion of fuel for propulsion, such as a various rockets and/or space vehicles. In certain applications, the optical sensors need to be capable of operating in environments, such as nuclear. One of these environments is the gamma flux emitted by fission or generated by neutron capture in the sensor and nearby materials. Ionizing events caused by these gammas, mainly via Compton, photo and pair-produced electrons, in the thin sensitive layers of the focal plane pixels, will blind the sensor once the gamma flux is sufficiently large so as to produce one or more ionizing events in each and every pixel in the time interval during which the pixels integrate the charges produced by optical photons. For certain applications this blinding gamma flux is on the order of $10^8$ gammas/cm$^2$/sec and higher.

When a single Compton electron traverses the sensitive layer of a semiconductor focal plane array pixel, which is typically 10 microns thick, it will deposit enough energy to produce on the average $10^4$ hole-electron pairs. An optical photon, when absorbed in this same layer, will produce only a single hole-electron pair. It is this $10^4$:1 advantage of a Compton electron relative to an optical photon that enables as little as one gamma event to overwhelm the charge deposited on a pixel from all the optical photons collected in a typical sample time.

It is thus seen that there is a need for an optical photon sensor capable of operating in a gamma flux environment. The gamma-insensitive optical sensor of this invention satisfied that need, by providing a sensor wherein the gammas can be rejected or distinguished from the optical photons.

SUMMARY OF THE INVENTION

It is an object of this invention to provide a gamma-insensitive optical sensor.

A further object of the invention is to provide an optical sensor having the capability of distinguishing a gamma event from an optical photon signal.

A further object of the invention is to provide an optical sensor whereby most gammas can be rejected.

Another object of the invention is to provide a gamma-insensitive optical sensor using a planar photocathode and a planar anode pad array separated by a narrow gas-filled gap containing a gas and across which is an electric potential.

Another object of the invention is to provide a gamma-insensitive optical sensor wherein the photocathode and/or the anode is made of monolithic quartz or of quartz scintillating glass, and plastic fibers.

Another object of the invention is to provide an optical sensor wherein the anode is composed of a planar pad array mounted on plate made of quartz fibers, with the pad array sufficiently thin to be transparent to Cerenkov light, thus increasing the rejection of gamma events.

Other objects and advantages of the present invention will become apparent from the following description and accompanying drawings. Basically, the invention involves an optical (ultra-violet/visible/infra-red) sensor which is insensitive to gamma energy and/or has the capability to discriminate an optical photon signal from a gamma event signal, whereby the sensor can operate effectively in a gamma environment. The sensor consists of a planar photocathode and a planar anode pad away separated by a narrow gap. The gap is filled with an appropriate gas and a voltage is applied across it. Electrons ejected from the photocathodes are accelerated sufficiently between collisions with the gas molecules to ionize them, forming an electron avalanche. The gap acts like a planar proportional counter. The anode pads on a front side of an anode plate are connected to matching contact pads on the back of the plate, with connection to signal processing electronics being made from the contact pads. The cathode and the anode plate may be made of monolithic quartz or quartz optical fibers. The anode pads may be thinned so as to be transparent to Cerenkov light such that additional Cerenkov photons reach the photocathode, thus increasing the percentage of gamma events rejected. Also, the quartz fibers may be replaced by scintillating glass or plastic fibers which improve gamma rejection.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is directed to optical sensors operating in ultra-violet, visible and infra-red wavelength bands which are gamma insensitive. Basically, the sensors comprise a planar photocathode and a planar anode pad array separated by a narrow gap. The gap is filled with an appropriate gas and a voltage is applied between the anode and the photocathode to produce an electric field within the gap. The photocathode includes a cathode plate which may be constructed, for example, of monolithic quartz or quartz optical fibers. The anode includes an anode plate which also may, for example, be constructed of monolithic quartz or quartz optical fibers, with the anode pad array located on the front side of the anode plate and connected to matching contacted pads on the back side of the anode plate by feed through wires. The contact pads are connected to signal processing electronics, such as by standard indium bump techniques. Also, the anode pad array may be thinned so as to be transparent to Cerenkov light which results in an increase in the rejections of gamma events. In addition, the quartz fibers of the cathode and anode plates may be replaced by scintillating glass or plastic fiber which provide improved gamma rejection. Thus, the gamma-insensitive optical sensors of the present invention may be considered as constituting two separate construction arrangements, one using cathode and anode plates constructed of material, such as monolithic quartz, and a second using cathode and anode plates using optical fibers, such as quartz, scintillating glass and plastic fibers, each having certain advantages and disadvantages, as set forth hereinafter.

Figure 1:
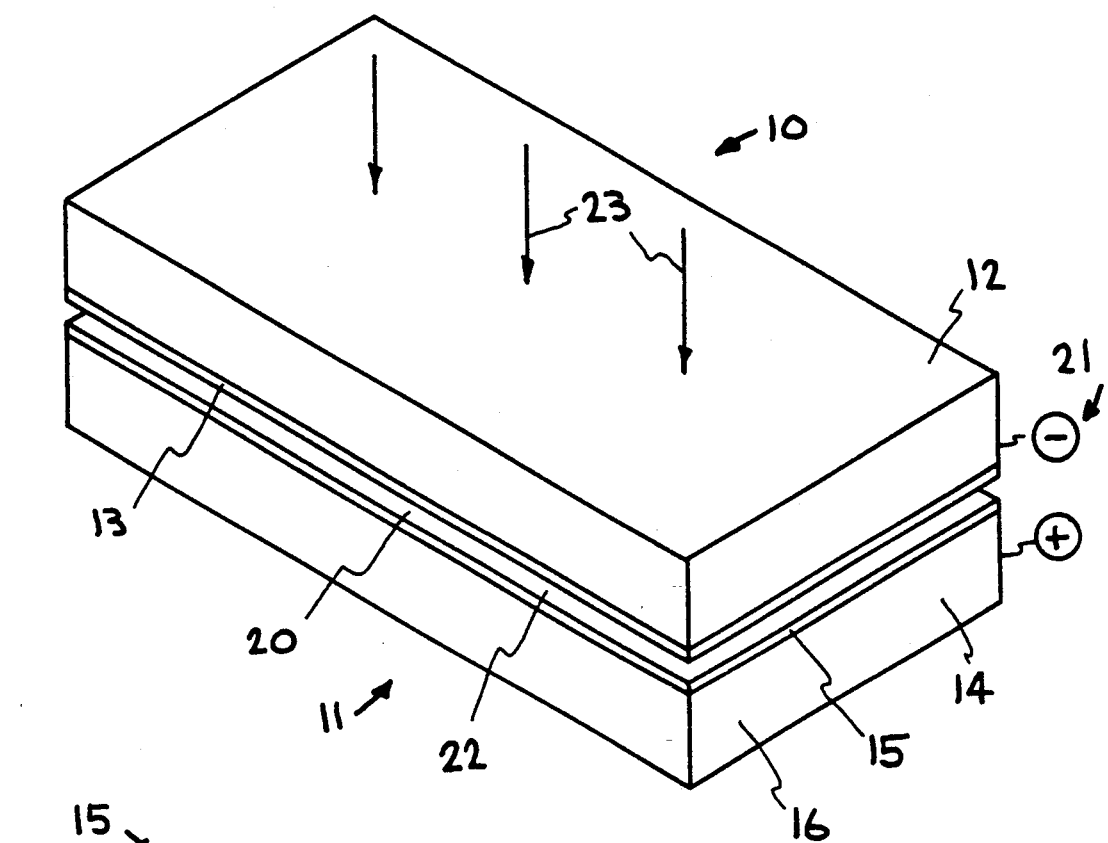
FIG. 1 is a perspective view of an embodiment of the optical sensor of this invention.
Figure 2:
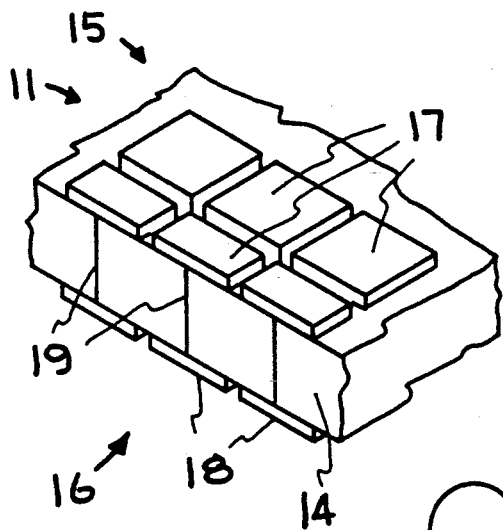
FIG. 2 is an enlarged partial view of the anode of the FIG. 1 embodiment.

Referring now to the drawings, FIG. 1 illustrates an embodiment of the invention comprising a cathode generally indicated at 10 and an anode generally indicated at 11. The cathode 10, includes a base or support plate 12 having a layer 13 of material secured thereto and referred to hereinafter and illustrated as a photocathode. The cathode plate 12 is constructed in this embodiment of monolithic quartz, but may be made of any other material transparent at the wavelength of the optical photons to be detected, or as illustrated in the FIG. 4 embodiment, constructed of transparent fibers, such as 1 mm (1000$\mu$) length, 30$\mu$ diameter quartz fibers. The photocathode 13 is constructed of a thin layer of a semi-transparent material which will convert to photons to be detected into an electron which is ejected into the gap between the photocathode and the anode. The type of material and its thickness are chosen to optimize the efficiency of this conversion process for the photon wavelength to be detected. For ultraviolate, visible, and near-infrared photons the best currently available photocathode materials are those commercially deposited by manufacturers of photomultiplier tubes. The anode 11 is constructed in this embodiment as illustrated in FIGS. 1 and 2 and comprises an anode plate 14 having on one side, referred to herein as the front side, an anode pad matrix or array of a desired pattern generally indicated at 15, and on the opposite side, referred to herein as the back side, a contact pad matrix or array of a matching pattern generally indicated at 16, with transparent anode pads 17 of array 15 and reflecting contact pads 18 of array 16 being electrically interconnected by feed through wires 19, such as 10$\mu$ diameter wires constructed of invar or any other suitable electric conductive material. The anode plate 14, in this embodiment is constructed of monolithic quartz, but may be constructed of other materials or of fibers as described above with respect to cathode plate 12. By way of example, cathode and anode plates 12 and 14 may have a 12×12 mm configuration, the anode pad matrix or array 15 may consist of 300×300−28$\mu$×28$\mu$ anode pad 17 constructed of thin (transparent) gold (Au), and the contact pad matrix or array 16 may also consist of 300×300−28$\mu$×28$\mu$ contact pads 18 constructed of opaque gold (Au), with indium bumps thereon, not shown, for connection to associated electronics. The anode pads 17 have a thickness of a few microns and the contact pads 18 also have a thickness of a few microns. Thus, the embodiment of FIG. 1 comprises a sensor having a 300×300−28$\mu$×28$\mu$ pixel pattern, each pixel consisting of an anode pad 17, a contact pad 18, and a feed through wire 19, with a 4$\mu$ space between pixels. The anode pads 17 are thinned so as to be transparent to Cerenkov light, such that additional Cerenkov photons can reach semi-transparent photocathode 13, as described hereinafter with respect to FIG. 4, whereby the percentage of gamma events rejected on the basis of the pixel pattern can be as large as about 50%.

Figure 5:
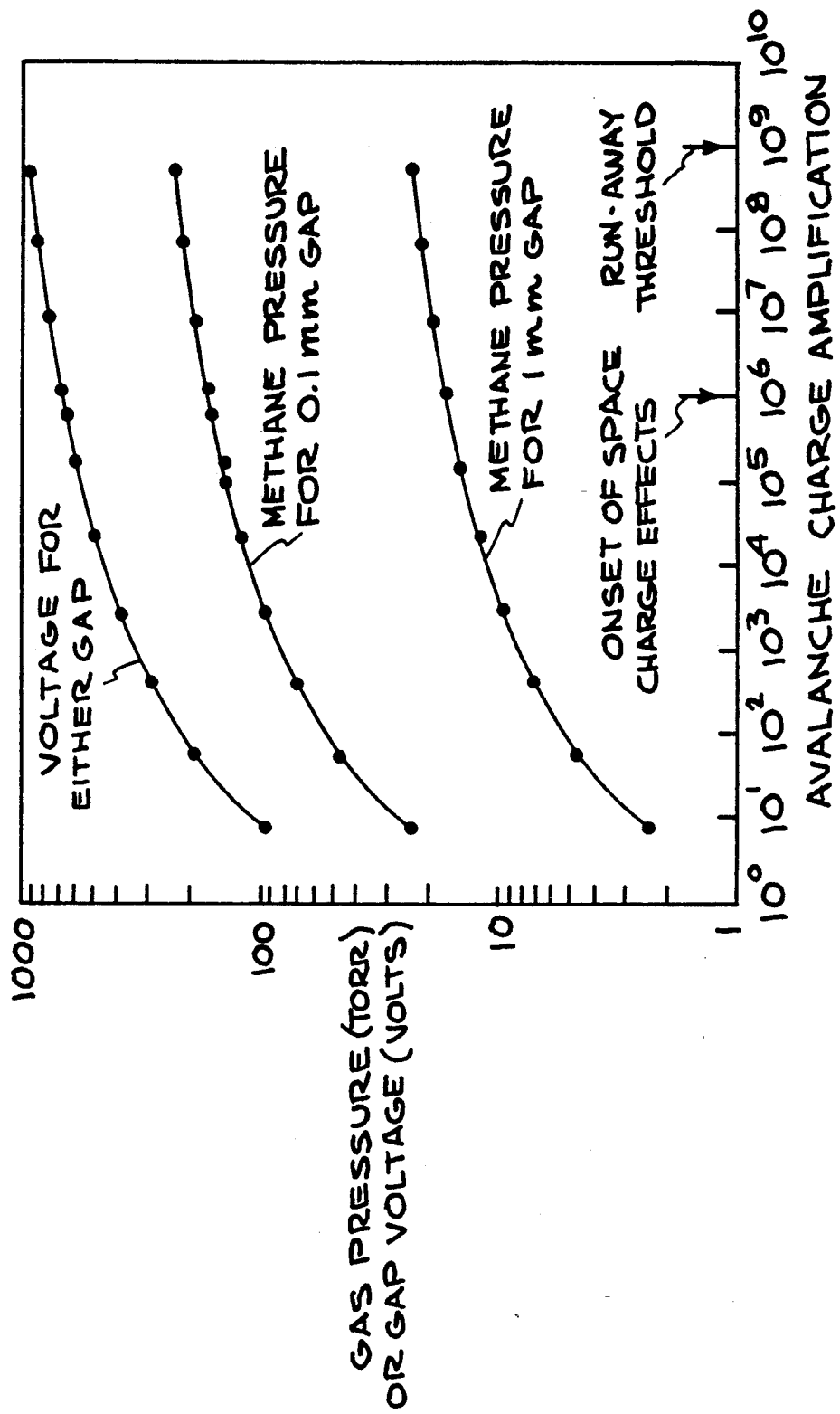
FIGS. 5 and 6 are graphs showing the avalanche charge amplification for methane and argon —$CH_4$ for a minimum gap voltage.
Figure 6:
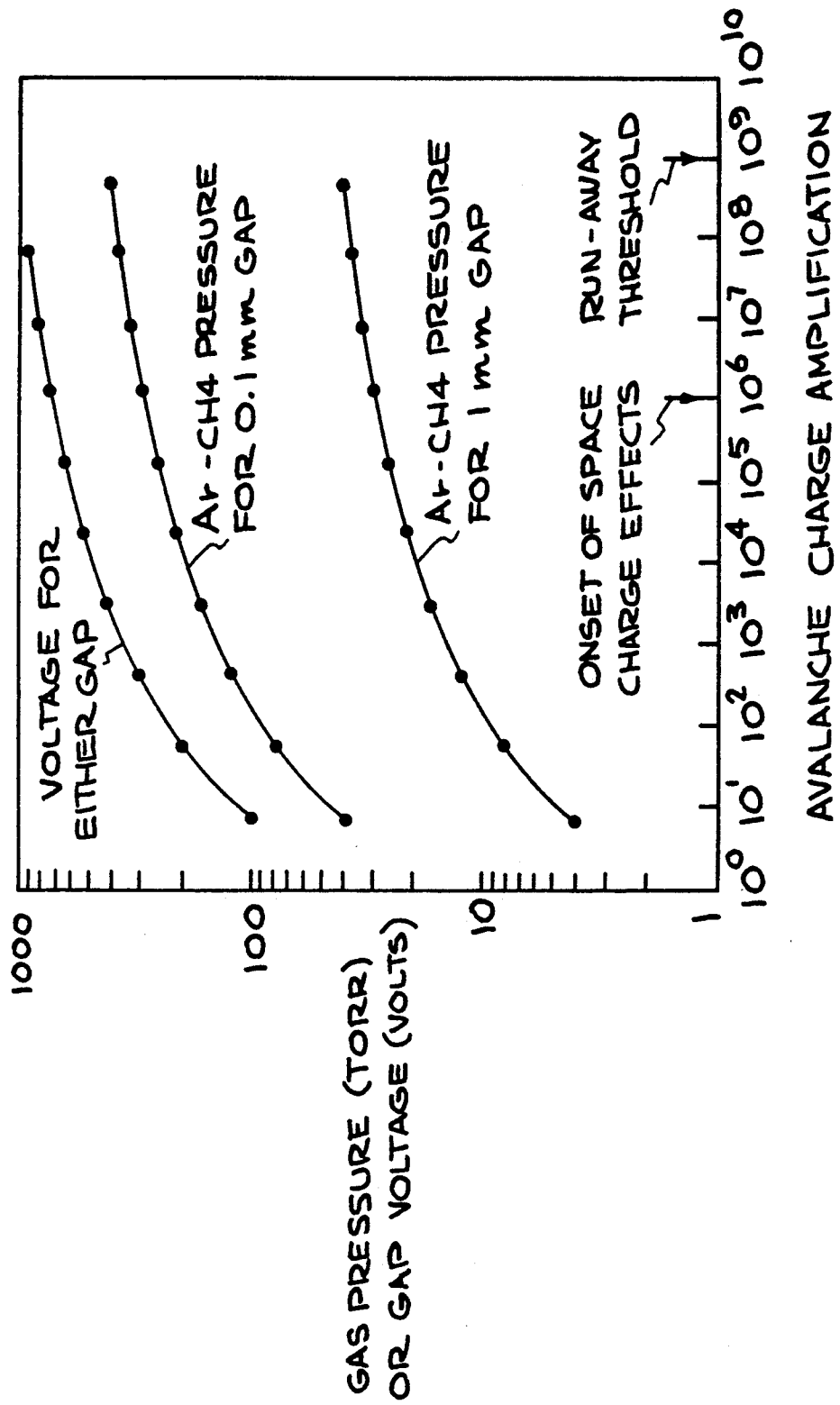

The cathode 10 is spaced from anode 11 to form a gap or region 20 having a width of 100$\mu$, for example, with a power supply generally indicated at 21 connected to the cathode and the anode to produce an electric field in gap 20. By way of example the power supply 21 may utilize a voltage of about 600 V so as to produce a charge amplification of about $10^6$ for a methane ($CH_4$) gas indicated at 22 and maintained in gap 20 at a pressure of about 150 torr. The charge amplification can be varied by varying both the voltage and pressure as shown in FIG. 5. FIG. 5 shows the gas pressure needed for a 100$\mu$ gap in order to obtain a given gain for a minimum gap voltage. If the gap is increased by a factor of, say, ten then the gas pressure need be reduced by the same factor as indicated in FIG. 5. FIG. 6 shows the same voltage and pressure conditions for argon (Ar)/methane ($CH_4$) mixture (90% Ar/10% $CH_4$ for example). However, many other gases or gas mixtures such as xenon, helium, or air may be suitable.

Figure 4:
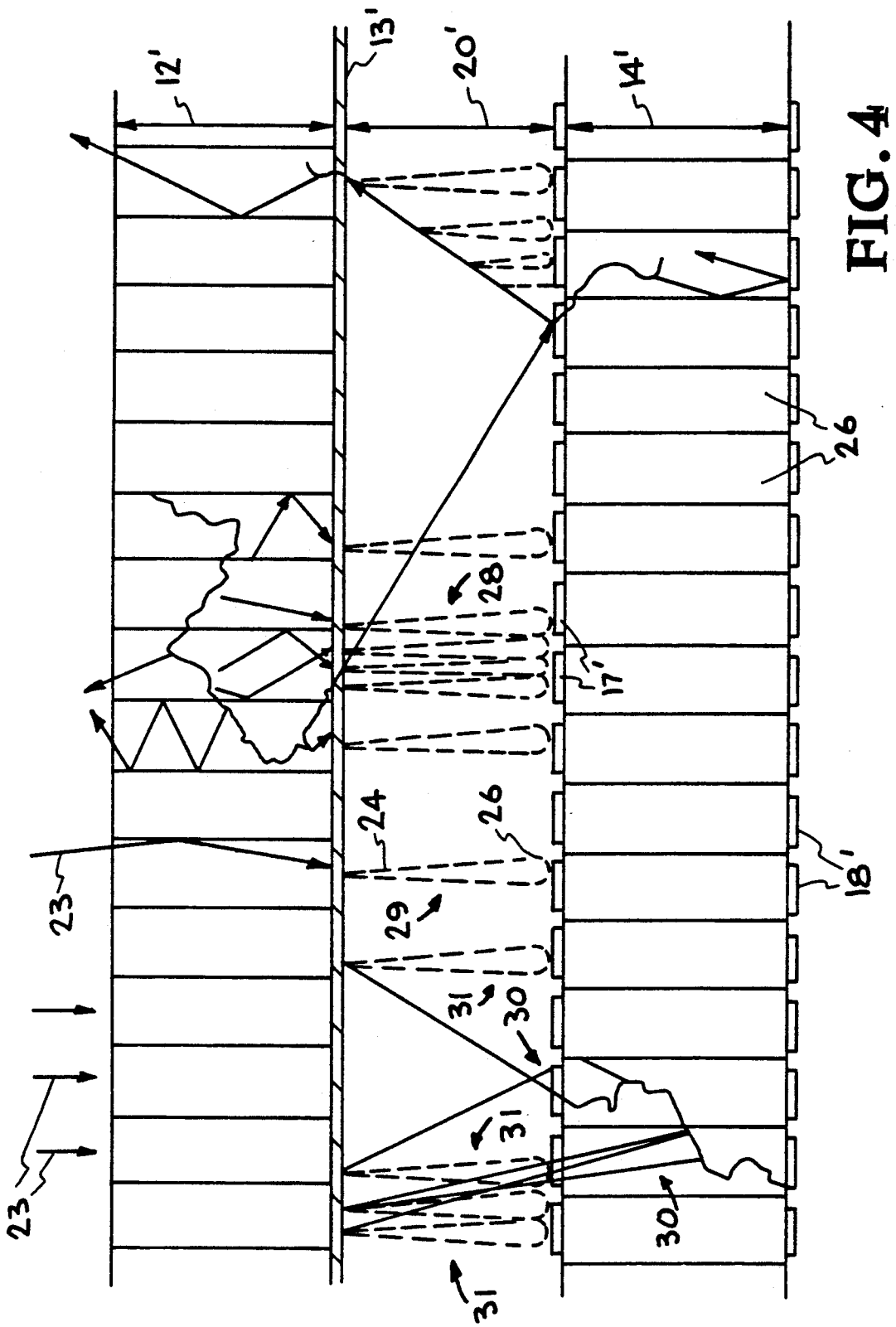
FIG. 4 is a schematic view of electron avalanches formed in another embodiment of the FIG. 1 optical sensor in a gamma environment, but utilizing a photocathode and anode having quartz fiber plates.

When optical (ultra-violet/visible/infra-red) photons, indicated by arrows 23 in FIG. 1 are incident on the cathode 10 electrons ejected from the photocathode 13 are accelerated sufficiently between collisions with the molecules of gas 22 in gap 20 due to the electric field therein to ionize the molecules, forming electron avalanches indicated at 24, as seen in FIG. 4, which is collected by the pads 17 of anode 11. The charge pulses thus collected on anode pads 17 pass via feed through wires 19 to contact pads 18 and to appropriate signal electronics as indicated at 25 in FIG. 4. Spatial resolution is inherently limited by the diameter of the head of the avalanche 24 when it arrives at an anode 17 of the anode pad array 15, and it has been experimentally established that for a 100 micron gap 20, the diameter of the avalanche head, indicated at 26, when it arrives at the anode pad 17 will be about 10 microns.

Figure 3:
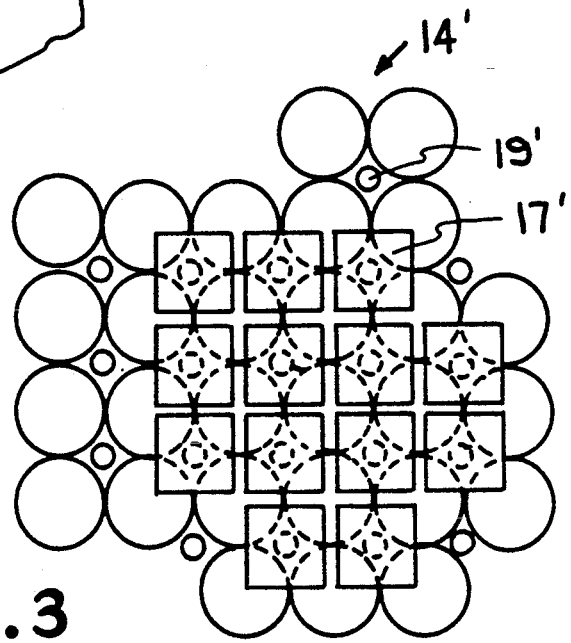
FIG. 3 is a partial cross-sectional view of another embodiment of the anode of the FIG. 1 optical sensor.

FIG. 3 illustrates in partial cross-section an embodiment of the anode 10 of FIG. 1 and is generally indicated at 10' wherein the anode plate 14 of FIG. 1 is composed of a plurality of quartz fibers 27 with feed through wires 19' extending between fibers 27 for connecting anode pads 17' to contact pads such as pads 18 in FIG. 1, but not shown in FIG. 3. The quartz fibers 27 of FIG. 3 may be replaced by scintillating glass or plastic fibers as discussed herein below. Also, the cathode plate 12 of the FIG. 1 embodiment may be constructed of fibers, such that both the cathode plate and the anode plate are constructed of quartz fibers, for example, having a length of 1000$\mu$ and width of 30$\mu$, as illustrated in the FIG. 4 embodiment.

When extremely low levels of optical photon fluxes are to be detected, the effect of gamma noise is significant for gamma fluxes above $10^{10}$ gammas/cm$^2$/sec. For this reason a means is needed by which gamma counts can be distinguished on the basis of some signature from optical signal counts, and these rejected. This is accomplished by the sensor of this invention, and described hereinafter with respect to FIG. 4.

One distinguishing signature of gamma events is that they produce several Cerenkov photons (in addition to perhaps one scintillation photon and one secondary electron, as indicated by legends in FIG. 4. These Cerenkov photons are produced along the track of the Compton electron until its energy falls below the Cerenkov threshold. The range of the electron can extend over dimensions which are many pixels diameters. If the cathode plate 12 is made of monolithic quartz, as in the FIG. 1 embodiment, then these photons will spread over the entire focal plane array (FPA). If the cathode plate 12' is made of quartz optical fibers, as in the FIG. 4 embodiment, then the photons will be trapped within the fiber in which they are produced. In either case, a gamma event would be characterized by several pixels simultaneously, shown at 28 in FIG. 4, registering a count, whereas an optical signal (or background) photon would only produce a count in one pixel, shown at 29 in FIG. 4. The Cerenkov pixel counts would occur in a cluster of ixels in a fiber optic cathod plate (FIG. 4 embodiment) or distributed over the FPA in a monolithic cathode plate (FIG. 1 embodiment).

Since one avalanche from one optical photon, having a head diameter of 10$\mu$ indicated at 29 in FIG. 4, can hit as many as four adjacent pixels (due to the pixels being spaced 4$\mu$ apart), a gamma event signature, indicated at 28 in FIG. 4, would be simultaneous counts in more than a cluster of four pixels. Considering that a large fraction of the Comptons are produced with an energy too low to produce any or a sufficient number of Cerenkov photons, it is unlikely that more than a quarter of the gamma events could be identified by the pixel count pattern. However, if the anode plate 14' is also made out of quartz fibers, as shown in FIGS. 3 and 4, and the anode pads 18-18' sufficiently thinned to be transparent to Cerenkov light, the additional Cerenkov photons, indicated at 30 in FIG. 4, would pass through the anode pads 18' and reach the photocathode 13' and produce electron avalanches indicated at 31. Under this condition the percentage of gamma events rejected on the basis of the pixel pattern could be as large as about 50%.

If the quartz fibers of the anode and cathode plates 12' and 14' are replaced by scintillating glass composed or scintillating plastic fibers, then two effects occur which greatly improve gamma rejection: 1) Compton electrons of all energies can produce photons in them, and 2) The number of optical photons produced increases by two orders-of-magnitude. The average number of photons detected per pixel is now larger than ten, except for the very small percentage of Comptons born with energies below a few keV. A gamma event can now be identified on the basis of its pixel pattern and its order-of-magnitude larger amplitude compared to an optical photon event. Most gammas can now be rejected.

Glass scintillation fibers of various types have been produced commercially with absolute optical photon production efficiencies as high as about 4%. Fiber-optic plates have been produced from 25$\mu$ diameter cladded glass scintillation fibers. Plastic scintillation efficiencies are a little higher than those of glass scintillators.

The optical sensor of this invention can be designed using cathode plates made of monolithic or fiber optic quartz, or scintillating glass or plastic fibers. The anode plate can also be made of these materials or of a material opaque to optical photons. The simplest design is that of the FIG. 1 embodiment using a monolithic quartz cathode plate 12 and an opaque anode plate 14. Replacing the monolithic quartz with a fiber optic quartz cathode plate doubles the gamma flux capability, while decreasing the gamma discrimination capability somewhat (fewer pixels producing a count).

Use of glass scintillating fibers reduces the gamma flux capability because the scintillation photons are emitted over about 100 nanoseconds (ns), but the gamma rejection is improved.

Plastic fibers have a much shorter scintillation time constant; however, they make the mechanical design more difficult than for glass fibers. The reason is that it is more difficult to hold the required mechanical tolerances with plastic and to deposit the photocathode 13' and the anode pads 17' on such a material compared to glass. The plastic fiber's thickness could be increased to 0.25 cm without increasing the gamma detection efficiency, since density is only about 1 g/cm$^3$. Cerenkov production would increase about a factor of two since it is proportional to the electron's path length.

Another penalty of the scintillating fibers (glass and plastic) is that they will absorb the UV photons and re-emit them in the visible region. Since the re-emission is isotropic, half of the photons will be lost.

The maximum count rate for the quartz plates is limited by the time resolution of the electronics associated with the optical sensor. The fast electronics, such as used in high-energy nuclear physics experiments are capable of nanosecond time resolution. The gas electron collection times will not be limiting if a 100 micron gap 20 is used (about 0.1 ns for $CH_4$, about 1 ns for $Ar/CH_4$). For scintillating fiber optic plates, the scintillation decay time will determine the maximum rate at which gamma pulses can be counted. For glass scintillators the time of decay from 90% to 10% of peak amplitude is about 100 ns. For some commercially produced fast plastic scintillators this decay time is about 2 ns. However, when wanting to count optical photons in the presence of a large gamma count background, the tail of the scintillation decay will impose additional restrictions on the usable gamma count rate, since photons emitted in the tail will appear to be incident optical photons. This can be overcome by lengthening the response time of the associated amplifier so that it will integrate all avalanches produced by a gamma, including those from photons emitted late in the scintillation tail. A quenching agent, such as benzyophenone, can be added to plastic scintillators, to decrease the scintillation tails; but at a loss in scintillation efficiency. An addition of 0.5% benzophenone reduces this efficiency by a factor of three, and the addition of 2% by an order-of-magnitude.

The maximum gamma count capability corresponds to each pixel of the sensor being busy 100% of the time counting gammas. Under this condition all optical signal counts would be lost. The usable gamma flux capability is determined by the percentage of optical signal loss that is tolerable. The usable gamma flux capability for 10% optical signal loss ranges from $2\times 10^{10}$ to $2\times 10^{12}$ gammas/cm$^2$/sec among the design variants of the sensor.

For all design variants of the optical sensor, a methane is a better choice for the counting gas 22 in gap 20 than argon/methane, since it has a higher electron drift velocity, although this will not be needed for the scintillating fiber embodiments of the sensor.

It has thus been shown that optical gas avalanche focal plane arrays using a quartz cathode plate are feasible with inherent gamma flux capability in the range of $10^{12}$ to $10^{13}$ gammas/cm$^2$/sec. This sensor will register a gamma or an optical photon as a single event with similar charge amplitude. This amplitude is adjustable and can be as large as $10^6$ charges. This sensor offers some gamma event rejection capability by use of the pixel count pattern; but at best 50% of the gamma counts can be expected to be rejected by this signature.

If a large fraction of the gammas need to be rejected, in order to decrease the contribution of gammas to the noise, gas avalanche focal plane arrays can be built using scintillating fiber optic cathode and anode plates, which produce a pulse amplitude for gammas which is an order of magnitude larger than for optical photons. Using this as a discriminant, most of the gammas can be rejected. For glass scintillating fibers, the gamma flux capability ranges from about $10^{10}$ to about $10^{11}$ gammas/cm$^2$/sec. If plastic scintillating fibers are used, the gamma flux capability will increase to about $10^{12}$ to about $10^{13}$ gammas/cm$^2$/sec.

These values of gamma flux capability corresponds to 10% signal count loss due to the sensor being busy counting gammas. The order of magnitude uncertainty in capability is due to uncertainties in scintillation decay and associated electronics time resolution achievable within system constraints.

The embodiments of the optical sensor of this invention use standard semi-transparent photocathodes of the photomultiplier industry. These offer about 10–20% quantum efficiency is the ultra-violet visible wavelength band (about 120–700 nanometers) and about 0.1–0.3% in the infrared wavelength band (about 700–1000 nanometers). The inherent noise or dark current of these photocathodes is sufficiently low so that they can operate at room temperature.

As set forth above, the invention utilizes two types of optical focal plane arrays using semi-transparent photocathodes and gas avalanche multiplication to count an optical photon or a gamma event as submicrosecond pulses with a charge that can be adjusted to be as large as $10^6$ electrons. Avalanche head diameters are sufficiently small to allow use of pixel sizes of tens of microns. The first of the two types of optical focal plane arrays of the present invention uses a quartz cathode plate and is of relatively simple mechanical design, which detects a gamma mainly through the Cerenkov photons radiated in the quartz by the high-energy end of the gamma-produced Compton electron spectrum, and can operate in a high gamma flux (about $10^{12}$–$10^{13}$ gammas/cm$^2$/sec.), but has little capability to discriminate between optical photon and gamma counts. The second of the two types of optical focal plane arrays uses scintillating fiber optic cathode and anode plates to detect all the gamma-produced electrons, and is a more complicated design, but it is inherently capable of discriminating between optical photons and gamma events on the basis of pulse height and pixel count pattern, and can operate in a gamma flux of $10^{10}$ to $10^{11}$ gammas/cm$^2$/sec. if built with scintillating glass fibers, and use of plastic scintillation fibers increases the tolerable gamma flux to $10^{12}$–$10^{13}$ gammas/cm$^2$/sec., but use of plastic scintillation fibers makes the mechanical design more difficult.

While particular embodiments of the invention have been illustrated and described, and specific materials, configurations, characteristics, etc., have been described such is not intended to limit the invention. Modifications and changes will become apparent to those skilled in the art. It is intended to cover in the scope of this invention that described and/or illustrated, as well as modifications and changes, and any limitation on the scope of this invention is based on the scope of the appended claims.

I claim:

1. A gamma-insensitive sensor comprising:
   a cathode;
   an anode;
   said cathode and said anode being separated to form a gap there between;
   said anode including a plurality of anode pads defining a pattern;
   said gap containing a gas;
   means for applying an electric potential between the anode and the cathode for producing an electric field in said gap; and
   means for detecting electron avalanche charges on said anode pads.

2. The sensor of claim 1, wherein said anode additionally includes an anode plate, said anode pads being located on one side of said plate, a plurality of contact pads located on an opposite side of said plate and defining a pattern, and means for electrically interconnecting each of said anode pads with a matching contact pad.

3. The sensor of claim 2, wherein said anode plate is constructed of monolithic materials transparent at the wavelength of the optical photons to be detected.

4. The sensor of claim 3, wherein the monolithic material is quartz.

5. The sensor of claim 2, wherein said anode plate is constructed from a plurality of transparent optical fibers selected from the group consisting of quartz fibers, scintillating glass fibers, and plastic fibers.

6. The sensor of claim 2, wherein said anode pads are constructed of a material transparent to Cerenkov light, and wherein said contact pads are constructed of a reflective material.

7. The sensor of claim 6, wherein each of said anode pads and said contact pads are constructed of gold, with said anode pads being thinner than said contact pads.

8. The sensor of claim 2, wherein said means for interconnecting said anode pads with said contact pads comprises a plurality of wires, each wire interconnecting a matching pattern pair of anode and contact pads.

9. The sensor of claim 2, wherein each of said contact pads includes means for connecting said contact pad to said means for detecting electron avalanches.

10. The sensor of claim 1, wherein said cathode includes a cathode plate and a layer of material constituting a semi-transparent photocathode positioned adjacent said gap.

11. The sensor of claim 10, wherein said cathode plate is constructed of monolithic materials transparent at the wavelength of the optical photons to be detected.

12. The sensor of claim 11, wherein said monolithic material is quartz.

13. The sensor of claim 10, wherein said cathode plate is constructed from a plurality of optical fibers selected from the group consisting of quartz fibers, scintillating glass fibers, and plastic fibers.

14. The sensor of claim 10, wherein said semi-transparent photocathode is constructed of material which will convert a photon of the wavelength to be detected into an electron ejected into the gap.

15. The sensor of claim 1, wherein said gas is selected from the group of methane, argon/methane mixtures, xenon, helium, air and mixtures thereof.

16. The sensor of claim 1, wherein said gap has a width of about 100 microns, and wherein said electric potential applied between said anode and said cathode is about 600 volts.

17. The sensor of claim 1, wherein at least one of said cathode and anode includes a plate constructed of optical fibers wherein said cathode includes a layer of material constituting a photocathode, wherein said anode pads are constructed of a material transparent to Cerenkov light, wherein said gap has a width of about 100 microns, wherein said gas is selected from methane and a 90% argon/10% methane mixture, and wherein said electrical potential between said anode and said cathode is about 600 volts.

18. An optical focal plane array, comprising:
a planar monolithic quartz cathode plate;
a semi-transparent photocathode layer coveringly disposed over a planar surface of the quartz plate;
a planar monolithic anode plate, positioned parallel to the photocathode layer and separated therefrom by a narrow gap, with a first planar surface of the anode plate being closer to the photocathode layer than a second planar surface of the anode plate;
a regular pixel array of anode pads disposed upon the first planar surface of the anode plate;
a regular pixel array of contact pads, similar to the anode pad array, disposed upon the second planar surface of the anode plate;
means for electrically connecting each anode pad to its corresponding contact pad;
a gas, positioned within the narrow gap; and
means for impressing a voltage across the narrow gap; whereby, when a photon strikes the photocathode layer, electrons are ejected therefrom and form an electron avalanche within the gas and across the narrow gap, with the diameter of the electron avalanche being sufficiently narrow so that the electron avalanche can impinge at most on four anode pads.

19. The optical focal plane array of claim 18, wherein said anode pads and said contact pads are constructed of gold, and wherein said contact pads are thicker than said anode pads.

20. The optical focal plane array of claim 18, additionally including means connected to said contact pads for detecting electron avalanches striking said anode pads.

21. An optical focal plane array, comprising:
a fiber optic planar cathode plate, in which the fibers are comprised of a material selected from the group consisting of quartz, scintillating glass, and scintillating plastic;
a semi-transparent photocathode layer coveringly disposed over a planar surface of the cathode plate;
a fiber optic planar anode plate, in which the fibers are comprised of a material selected from the group consisting of quartz, scintillating glass, and scintillating plastic, positioned parallel to the photocathode layer and separated therefrom by a narrow gap, with a first planar surface of the anode plate being closer to the photocathode layer than a second planar surface of the anode plate;
a regular pixel array of anode pads disposed upon the first planar surface of the anode plate;
a regular pixel array of contact pads, similar to the anode pad array, disposed upon the second planar surface of the anode plate;
means for electrically connecting each anode pad to its corresponding contact pad;
a gas, positioned within the narrow gap; and
means for impressing a voltage across the narrow gap; whereby, when a photon strikes the photocathode layer, electrons are ejected therefrom and form an electron avalanche within the gas and across the narrow gap, with the diameter of the electron avalanche being sufficiently narrow so that the electron avalanche can impinge at most on four anode pads.

22. The optical focal plane array of claim 21, wherein said anode pads are constructed to be transparent to Cerenkov light, and wherein said contact pads are constructed to be reflective of Cerenkov light.

* * * * *